United States Patent
Mihailov et al.

(10) Patent No.: US 7,515,792 B2
(45) Date of Patent: Apr. 7, 2009

(54) METHOD OF INCREASING PHOTOSENSITIVITY OF GLASSES TO ULTRAFAST INFRARED LASER RADIATION USING HYDROGEN OR DEUTERIUM

(75) Inventors: Stephen J. Mihailov, Kanata (CA); Christopher W. Smelser, Ottawa (CA); Dan Grobnic, Ottawa (CA); Robert B. Walker, Spencerville (CA); Ping Lu, Ottawa (CA); Huimin Ding, Nepean (CA); Gino Cuglietta, Kanata (CA); Xiaoli Dai, Ottawa (CA)

(73) Assignee: Her Majesty the Queen in Right of Canada as Represented by the Minister of Industry, Through the Communications Research Centre Canada, Ottawa (CA)

( * ) Notice: Subject to any disclaimer, the term of this patent is extended or adjusted under 35 U.S.C. 154(b) by 23 days.

(21) Appl. No.: 11/683,070

(22) Filed: Mar. 7, 2007

(65) Prior Publication Data

US 2007/0154143 A1 Jul. 5, 2007

Related U.S. Application Data

(63) Continuation-in-part of application No. 11/243,193, filed on Oct. 5, 2005, now Pat. No. 7,379,643, which is a continuation-in-part of application No. 10/803,890, filed on Mar. 19, 2004, now Pat. No. 7,031,571, which is a continuation-in-part of application No. 10/639,486, filed on Aug. 13, 2003, now Pat. No. 6,993,221, said application No. 11/243,193 is a continuation-in-part of application No. 11/104,545, filed on Apr. 13, 2005, now abandoned.

(60) Provisional application No. 60/456,184, filed on Mar. 21, 2003, provisional application No. 60/616,838, filed on Oct. 8, 2004, provisional application No. 60/545,949, filed on Feb. 20, 2004, provisional application No. 60/561,882, filed on Apr. 14, 2004, provisional application No. 60/634,547, filed on Dec. 10, 2004, provisional application No. 60/780,870, filed on Mar. 10, 2006.

(51) Int. Cl.
*G02B 6/34* (2006.01)
(52) U.S. Cl. ..................................................... 385/37
(58) Field of Classification Search .................... 385/37
See application file for complete search history.

(56) References Cited

U.S. PATENT DOCUMENTS 4,807,950 A 2/1989 Glenn et al. ................. 385/123

(Continued)

OTHER PUBLICATIONS

Fertein et al, "Refractive-index changes of standard telecommunication fiber through exposure to femtosecond laser pulses at 810 cm", Applied Optics, vol. 40, No. 21, Jul. 20, 2001, pp. 3506-3508.*

(Continued)

*Primary Examiner*—Ellen Kim
(74) *Attorney, Agent, or Firm*—Teitelbaum & MacLean; Neil Teitelbaum; Doug MacLean

(57) ABSTRACT

A method of increasing the refractive index in a photosensitive glass is disclosed so as to induce an refractive index change of at least $10^{-5}$ within a region of the glass. The method includes the step of providing a hydrogen or deuterium loaded doped glass material wherein a dopant within the glass is photosensitive to infrared radiation in the presence of hydrogen or deuterium. The hydrogen or deuterium loaded doped glass is subsequently irradiated with femtosecond pulses of infrared light having an intensity of at least $10^9$ W/cm$^2$ and less than $5 \times 10^{13}$ W/cm$^2$.

10 Claims, 4 Drawing Sheets

U.S. PATENT DOCUMENTS

| | | | | |
|---|---|---|---|---|
| 5,287,427 | A | 2/1994 | Atkins et al. | 385/124 |
| 5,367,588 | A | 11/1994 | Hill et al. | 430/5 |
| 5,495,548 | A | 2/1996 | Bilodeau et al. | 385/123 |
| 5,978,538 | A | 11/1999 | Miura et al. | 385/123 |
| 6,573,026 | B1 | 6/2003 | Aitken et al. | 430/290 |
| 6,768,850 | B2 | 7/2004 | Dugan et al. | 385/124 |
| 6,941,052 | B2* | 9/2005 | Viswanathan et al. | 385/123 |
| 2003/0110810 | A1* | 6/2003 | Dunn et al. | 65/392 |
| 2004/0120643 | A1* | 6/2004 | Viswanathan et al. | 385/37 |
| 2004/0184734 | A1 | 9/2004 | Mihailov et al. | 385/37 |
| 2004/0223694 | A1* | 11/2004 | Dower et al. | 385/37 |
| 2005/0201682 | A1* | 9/2005 | Hosono et al. | 385/37 |
| 2006/0126992 | A1* | 6/2006 | Hashimoto et al. | 385/14 |

OTHER PUBLICATIONS

P. J. Lemaire et al. in *Electron. Lett.* vol. 29, No. 13, pp. 1191-1193 (1993).

K.M. Davis et al. Opt. Lett 21, 1729 (1996).

M. Svalgaard and M. Kristensen in "Directly UV written silica-on-silicon planar waveguides with low loss," *Electron. Lett.*, vol. 33, No. 10, pp. 861-863, 1997.

M. Svalgaard, "Direct writing of planar waveguide power splitters and directional couplers using a focused ultraviolet laser beam," *Electron. Lett.*, vol. 33, No. 20, pp. 1694-1695, 1997.

C. Dalle, Patrick Cordier, C. Depecker, P. Niay, P. Bernage, and M. Douay, "Growth kinetics and thermal annealing of UV-induced H-bearing species in hydrogen loaded germanosilicate fibre preforms," Journal of Non-Crystalline Solids, vol. 260, No. 1-2, pp. 83-98, 1999).

L. Sudrie, M. Franco, B. Prade, and A. Mysyrowicz, "Study of damage in fused silica induced by ultra-short IR laser pulses," *Opt. Comm.*, vol. 191, No. 3-6, pp. 333-339, 2001.

Takada and Abe "Slab-waveguide irradiation of uv laser light for photosensitive phase error compensation of arrayed-waveguide gratings," *IEEE Photon. Tech. Lett.*, vol. 14, No. 6, pp. 813-815, 2002.

C. W. Smelser, S. J. Mihailov, and D. Grobnic, entitled "Hydrogen loading for fiber grating writing with a femtosecond laser and a phase mask," *Opt. Lett.*, vol. 29, No. 18, pp. 2127-2129, 2004.

C. W. Smelser, S. J. Mihailov, and D. Grobnic, "Formation of type I-IR and Type II-IR gratins with an ultrafast IR laser and a phase mask," *Opt. Exp.*, vol. 13, No. 14, pp. 5377-5386, 2005.

* cited by examiner

METHOD OF INCREASING PHOTOSENSITIVITY OF GLASSES TO ULTRAFAST INFRARED LASER RADIATION USING HYDROGEN OR DEUTERIUM

CROSS-REFERENCE TO RELATED APPLICATIONS

The present application claims priority from U.S. Patent Application 60/780,870 filed Mar. 10, 2006, which is incorporated herein by reference for all purposes.

The present application is a continuation-in-part of U.S. patent application Ser. No. 11/243,193 filed Oct. 5, 2005 now U.S. Pat. No. 7,379,643 which is a continuation-in-part of U.S. patent application Ser. No. 10/803,890 filed Mar. 19, 2004 now U.S. Pat. No. 7,031,571, which is a continuation-in-part of U.S. patent application Ser. No. 10/639,486 filed Aug. 13, 2003 now U.S. Pat. No. 6,993,221, which claims priority from U.S. Patent Application No. 60/456,184 filed Mar. 21, 2003. U.S. patent application Ser. No. 11/243,193 filed Oct. 5, 2005 claims priority from 60/616,838 filed Oct. 8, 2004, which are all incorporated herein by reference for all purposes. U.S. patent application Ser. No. 10/803,890 filed Mar. 19, 2004 claims priority from U.S. Patent Application No. 60/545,949 filed Feb. 20, 2004; and U.S. patent application Ser. No. 11/243,193 filed Oct. 5, 2005, is also a continuation-in-part of U.S. patent application Ser. No. 11/104,545 filed Apr. 13, 2005 now abandoned, which claims priority from U.S. Patent Application No. 60/561,882 filed Apr. 14, 2004; U.S. Patent Application No. 60/616,838 filed Oct. 8, 2004 and from U.S. Patent Application No. 60/634,547 filed Dec. 10, 2004, which are all incorporated herein by reference for all purposes.

FIELD OF THE INVENTION

This invention relates generally to a method and system for inducing a refractive index change in optical media such as optical fibers and slab waveguides, and particularly to a method of fabricating waveguides therein.

BACKGROUND OF THE INVENTION

The fabrication of many photonic devices has been achieved through exposure of transmissive and absorbing materials to intense laser radiation in order to change the optical properties of said materials. For example, UV-induced photosensitivity of germanium doped silica glasses has been exploited in order to create permanent refractive index changes in the photosensitive Ge-doped silica cores of single mode optical fibers and waveguides as opposed to the undoped cladding. By creating a spatial intensity modulation of the UV exposure either by using a two-beam interference technique as disclosed in U.S. Pat. No. 4,807,950 by Glenn et al. or by using a phase mask as disclosed in U.S. Pat. No. 5,367,588 by Hill et al., Bragg grating structures can be produced in the photosensitive core of the waveguide.

Direct laser writing of planar waveguides into photosensitive Ge-doped glass films on silicon using a focused ultraviolet 244 nm continuous wave (CW) laser beam was first demonstrated by M. Svalgaard and M. Kristensen in "Directly UV written silica-on-silicon planar waveguides with low loss," *Electron. Lett.*, vol. 33, no. 10, pp. 861-863, 1997. In order to be able to induce sufficient index change with the UV light, the Ge-doped glass film often needs to be photosensitized to UV light by exposing such an optical fiber to hydrogen or deuterium gas at elevated pressures and temperatures as taught by Atkins et al. in U.S. Pat. No. 5,287,427. The process taught by Atkins et al. is often referred to as "hydrogen loading". The fabrication of practical laser direct write waveguide devices requires the induction of large changes of refractive index $\Delta n$ in the target material on the order of $3\text{-}6\times 10^{-3}$ as was reported by M. Svalgaard, "Direct writing of planar waveguide power splitters and directional couplers using a focused ultraviolet laser beam," *Electron. Lett.*, vol. 33, no. 20, pp. 1694-1695, 1997.

Recently processes that employ high-intensity laser pulses in the femtosecond pulse duration regime for creating permanent changes in the refractive indices of glasses have been explored by several groups of researchers. K. M. Davis et al. disclose a technique for inducing index change in bulk glasses with ultra-high peak power femtosecond infra-red radiation in Opt. Lett 21, 1729 (1996). The creation of waveguides in bulk glasses using this technique is taught by Miura et al. in U.S. Pat. No. 5,978,538 while the modification or trimming of existing waveguide structures is taught by Dugan et al. in U.S. Pat. No. 6,768,850. The physical process that appears to cause the refractive index change in the materials is due to the creation of free electrons through non-linear absorption and multi-photon ionization of bound charges, followed by avalanche ionization and localized dielectric breakdown as these free electrons are accelerated by the intense but short time duration laser field. Also, this leads to a localized melting and restructuring of the material and a concurrent increase in the index of refraction. Work performed in this field has used laser pulses that are tightly focused to near-diffraction limited spot sizes generating extremely high intensities of light, approximately $10^{14}$ W/cm$^2$, in order to initiate non-linear absorption processes in the materials.

The femtosecond laser based direct write processes suffer from the potential problem of over exposure of the bulk glass. This over-exposure with too high an intensity can lead to an unwanted physical damage of the glass resulting in undesired attenuation of the optical signals transmitted through the laser generated waveguide.

Recently it has been demonstrated that there are two regimes of ultrafast infra-red laser induced index change in both bulk SiO$_2$ and optical fiber that are dependent on the incident laser power. In the work by L. Sudrie, M. Franco, B. Prade, and A. Mysyrowicz, "Study of damage in fused silica induced by ultra-short IR laser pulses," *Opt. Comm.*, vol. 191, no. 3-6, pp. 333-339, 2001, two power thresholds of ultrafast IR induced $\Delta n$ in bulk silica were identified, one for a reversible index change that could be annealed out at temperatures below the glass transition temperature of the SiO$_2$ (900° C.). The second higher power threshold was the self-focusing threshold above which the induced index change was likely a result of multiphoton and avalanche ionization causing plasma formation. The resultant index change would not anneal out at 900° C. In fiber Bragg grating fabrication, these two regimes for ultrafast IR induced index change were also observed and denoted as Type I-IR and Type II-IR induced index change as reported in C. W. Smelser, S. J. Mihailov, and D. Grobnic, "Formation of Type I-IR and Type II-IR gratings with an ultrafast IR laser and a phase mask," *Opt. Exp.*, vol. 13, no. 14, pp. 5377-5386, 2005.

The state of the art writing grating structures or changing the refractive index in a photosensitive media has changed over the years. By way of example, U.S. Pat. No. 6,941,052 in the names of Viswanathan, Nirmal K. et al. filed Jun. 24, 2004 states the following:

"Special features may be built into selected lengths of optical fibers to be spliced into fiber optic networks. A fiber Bragg grating represents a light-modifying feature that may be introduced or written into an optical fiber by exposure to ultraviolet light. The process of introducing special features such as Bragg gratings into an optical fiber may include a number of steps requiring handling of relatively short lengths of optical fiber during a series of manufacturing operations. An optical fiber typically requires removal of protective coatings before changing the physical characteristics of the fiber to include a Bragg grating. After writing a Bragg grating, the fiber may be annealed and re-coated to protect the optical fiber and its imprinted waveguide from physical damage or attack by environmental contaminants."

Viswanathan et al., further discuss the use of hydrogen loading in order to increase the sensitivity of germanosilicate glasses to UV radiation which is consistent with the state of art. The following description is found in U.S. patent application 20040120643.

"The magnitude of change in the refractive index of glass substrates, exposed to ultraviolet laser energy, depends upon the sensitivity of the glass to the ultraviolet radiation. It is known that silica glass substrates, such as optical fibers, may be treated to include chemical elements such as germanium in their structure. This produces germano-silicate glasses, which have increased sensitivity to ultraviolet radiation. Further increases in sensitivity to ultraviolet radiation have been achieved using a process known as hydrogen loading. The process of hydrogen loading involves treating glass in an environment of hydrogen at high pressures and elevated temperatures that promote hydrogen diffusion into the glass. Hydrogen-loaded germano-silicate fibers represent the current substrate of choice for manufacture of glass fiber-containing refractive index gratings resulting from exposure to ultraviolet radiation. Such gratings exhibit a marked variation in the magnitude of periodic refractive index change ($\Delta n$) along the length of a grating. The magnitude of refractive index change is known to diminish during the process of grating stabilization, involving high temperature annealing. It is believed that annealing causes some loss of hydrogen and other species that affect the magnitude of refractive index change."

United States patent application further discusses the notion of irradiating glass by using lasers emitting pulses of energy at femtosecond pulse widths in the near infrared (NIR) region of the spectrum to produce permanent refractive index changes in various glasses.

The following passage from U.S. patent application 20040120643 illustrates the deleterious side effects of using high intensity pulsed light to create a permanent refractive index difference in glass.

"Refractive index changes in glass result from multi-photon photochemical reactions during exposure to femtosecond laser pulses. Exposure to short femtosecond energy pulses in this way yields waveguides that, unlike hydrogen-loaded glasses, retain a relatively stable change in the magnitude of refractive index variation. Although changes in refractive index remain relatively stable, visible defects accompany waveguide formation in several glasses including silica and germano-silicate glasses. The defects compromise the mechanical strength of optical fibers after fabrication of optical devices such as optical fiber waveguides. This suggests that near infrared laser pulses, operating at femtosecond pulse widths, are unsuitable for use with optical fibers, due to the occurrence of damage to the processed glass. A further disadvantage of near infrared femtosecond laser pulses is the minimum diffraction-limited spot size obtainable by focusing lasers of this type. The minimum spot sizes achievable after laser beam focusing, in this case, is approximately 2 µm-3 µm. Bragg gratings having suitable wavelength characteristics for telecommunications applications require focusing of the exposing laser beam to produce fringe periodicity of approximately 0.5 µm."

We have found that for practical femtosecond laser direct-write fabrication of waveguide structures, high index changes need to be achieved in a reasonable amount of time in a regime where the formation of laser-induced physical damage is avoided (Type I-IR).

For Ge-doped silica glasses it was taught by Mihailov et al. in U.S. Patent Appl. 2004/0184734 incorporated herein by reference, for all purposes, that index modulations of almost the same magnitude could be induced simultaneously in the Ge-doped core and pure silica cladding region of a standard telecom fiber in order to produce a cladding mode suppressed grating response. It would therefore be difficult to preferentially induce an index change in a Ge-doped core of a planar lightwave circuit (PLC) or Ge-doped slab waveguide without inducing index change to the surrounding pure silica cladding regions.

The process of hydrogen loading is normally associated with increasing photosensitivity of Ge-doped silica waveguides to actinic radiation such as high photonic energy UV photons but not low photonic energy infrared photons which do not possess sufficient photonic energy to induce the photochemical reaction for production of hydrogen based Ge-defects that associated with the index change. In fact at low IR intensities, for example telecommunication pulses in an optical network, the hydrogen loaded Ge-doped waveguides are not more photosensitive to infrared photons (i.e. an index change is not induced).

In stark contrast to the teaching of Aitkens in U.S. Pat. No. 6,573,026, we have found and have reported in a paper by C. W. Smelser, S. J. Mihailov, and D. Grobnic, entitlted "Hydrogen loading for fiber grating writing with a femtosecond laser and a phase mask," *Opt. Lett.*, vol. 29, no. 18, pp. 2127-2129, 2004, incorporated herein by reference, that in fact the threshold for high intensity Type I-IR induced index change could be substantially reduced in Ge-doped fiber if in fact the fiber is hydrogen loaded even though the Ge-doped region is traditionally not photosensitive to the 800 nm irradiation wavelength of the laser.

If sufficiently high intensity is realized, that is, if there are a large number of low energy photons incident simultaneously, a multi-photon absorption process will occur that will cause a similar photochemical reaction as with a single high energy UV photon. Such a process is advantageous for ultrafast laser direct write waveguides in photosensitive films and bulk glasses as lower ultrafast IR intensities could be used to induce the Type I-IR index change thus increasing waveguide fabrication speed and performance. By having interstitial top and bottom cladding layers made of pure silica for example, waveguides could be induced in the hydrogen-loaded photosensitive slab layer without inducing index change in the cladding layers.

Smelser et al. in *Opt. Lett.* vol. 29, no. 18, pp. 2127-2129, 2004 have shown that surprisingly, the process of "hydrogen-loading" is advantageous in increasing the photosensitivity of Ge-doped layers to high intensity ultrafast infrared radiation.

The technique of hydrogen-flame brushing of Ge-doped optical fiber and waveguides as taught by Bilodeau et al. in U.S. Pat. No. 5,495,548 would also result in increased photosensitivity of said optical fiber and waveguides to high intensity ultrafast infrared radiation.

Traditionally ultrafast IR induced refractive index change requires regeneratively amplified femtosecond IR pulses. By reducing the threshold for an induced refractive index change, lower power less complicated and less expensive exposure sources could be utilized for the direct write inscription, namely the un-amplified femtosecond pulses from the laser oscillator. Such a pulse source operates in the MHz regime, rather than the kHz regime, which would facilitate the inscription of more continuous waveguide structures. Alternatively, a less tightly focused ultrafast IR beam from a regenerative amplifier could be used to induce a refractive index change in a specific large region of a hydrogen loaded Ge-doped layer for the fabrication of slab waveguides or the large interference 'free-space' regions of arrayed waveguide gratings (AWGs) or multimode interference (MMI) couplers through use of a contact printing mask or mask projection similar to photolithographic processes. As well a defocused ultrafast IR beam could be used for phase error corrections of AWGs. Takada and Abe in a paper entitled "Slab-waveguide irradiation of uv laser light for photosensitive phase error compensation of arrayed-waveguide gratings," *IEEE Photon. Tech. Lett.*, vol. 14, no. 6, pp. 813-815, 2002. incorporated herein by reference, show that a prolonged UV exposure through a contact mask placed on the slab waveguide interference region of an AWG can correct for phase errors in the AWG. A similar process using defocused ultrafast IR light could also be used It is an objective of this invention to overcome the aforementioned limitations within the prior art systems of inducing refractive index change for direct write waveguides using femtosecond time duration laser radiation.

SUMMARY OF THE INVENTION

In accordance with this invention, there is provided, a method of increasing the refractive index in hydrogen or deuterium loaded doped glass wherein a dopant within the glass is photosensitive to infrared radiation in the presence of hydrogen or deuterium so as to induce an refractive index change of at least $10^{-5}$ within a region of the glass, the method comprising the steps of:

irradiating the hydrogen or deuterium loaded doped glass with femtosecond pulses of light having an intensity of at least $10^9$ W/cm$^2$ and less than $5 \times 10^{13}$ W/cm$^2$.

In accordance with this invention a method is provided comprising the steps of:

providing a photosensitive material that is photosensitized by exposing to one of hydrogen and deuterium gas;

providing electromagnetic radiation from an ultra-short pulse duration laser, wherein the electromagnetic radiation has a pulse duration of less than or equal to 500 picoseconds, wherein the wavelength of the electromagnetic radiation has a characteristic wavelength corresponding to infrared light, the electromagnetic radiation incident on the photosensitive material being sufficiently intense to cause a permanent change in an index of refraction of the photosensitive material.

In accordance with an aspect of this invention a method of writing a grating in a Ge doped glass is provided wherein the non-linear absorption to IR irradiation is increased by hydrogen or deuterium loading the Ge Doped glass prior to irradiating with light having an intensity of at least $10^9$ W/cm$^2$ and less than about $5 \times 10^{13}$ W/cm$^2$.

BRIEF DESCRIPTION OF DRAWINGS

The invention is now described with reference to the drawings in which.

DETAILED DESCRIPTION OF THE INVENTION

Slab waveguide structures made with Ge-doped silica on silicon are a popular medium for direct-write inscription of photonic circuits. By exposing such a waveguide to high pressure hydrogen or deuterium, the Ge-doped silica slab portion of the waveguide is more photosensitive to high intensity IR light, by reducing the threshold for multi-photon absorption induced refractive index change.

Figure 1:
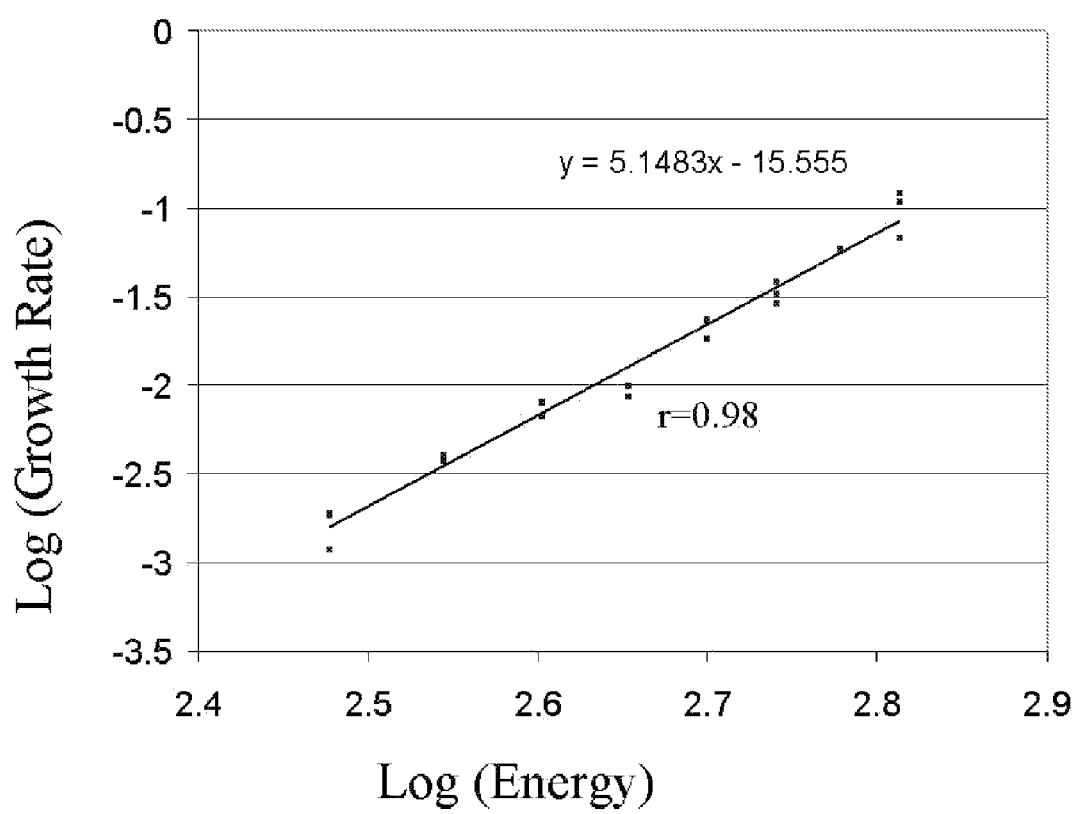
FIG. 1 shows a scatter plot of the Log(growth rate) vs. Log(energy) where the growth rate refers to the index modulation growth rate of a fiber Bragg grating fabricated in 3% Ge-doped silica telecom fiber that is hydrogen loaded at 2600 psi, 23° C. for 14 days, and energy is the variation of the 800 nm IR pulse energy.

For 3% Ge-doping by weight of pure silica, the threshold intensity for induced index change is reduced by a factor of 3 when the substrate is loaded with 2600 psi molecular hydrogen or deuterium gas for 14 days at room temperature. It is likely that the threshold would be more substantially reduced for higher concentrations of Ge-dopant. The measurement of the variation of induced index change in hydrogen-loaded Ge-doped silica as a function of incident femtosecond IR beam intensity can easily be measured by inscribing a grating structure in a Ge-doped core region of an optical fiber or waveguide as shown by Smelser et al. *Opt. Lett.* vol. 29, no. 18, pp. 2127-2129, 2004. In FIG. 1, for a given index change, the rate (# of pulses) required to achieve that index change as a function incident intensity varies exponentially. From FIG. 1, the log-log plot has a line of best fit with a slope of ~5 and a correlation coefficient of r=0.98, indicating that the process of induced index change in a multi-photonic process requiring the absorption of 5 photons.

Figure 2:
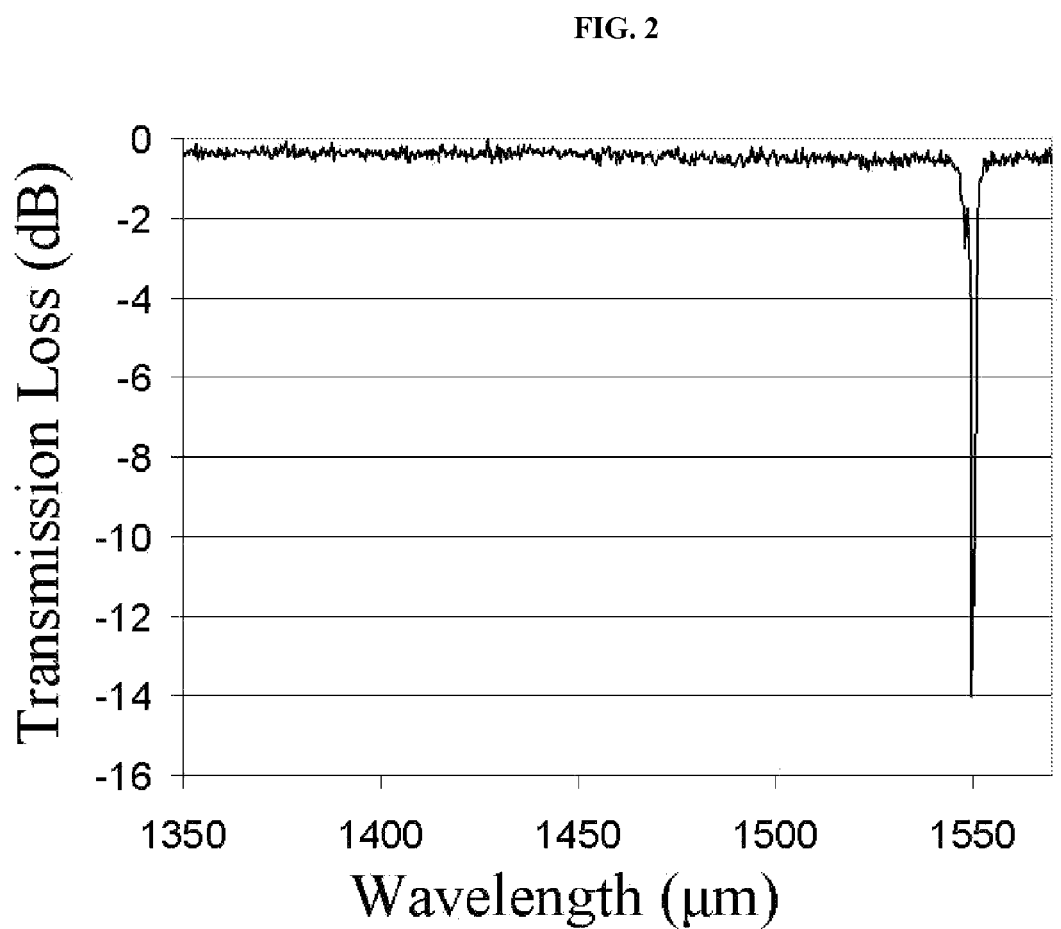
FIG. 2 shows a broadband absorption spectrum of a Bragg grating induced in unloaded 3% Ge-doped single mode silica telecom optical fiber (SMF-28) with 800 nm 125 fs laser radiation and a 1.071 µm period phase mask. The induced index change is large and is ~$5 \times 10^{-3}$.
Figure 3:
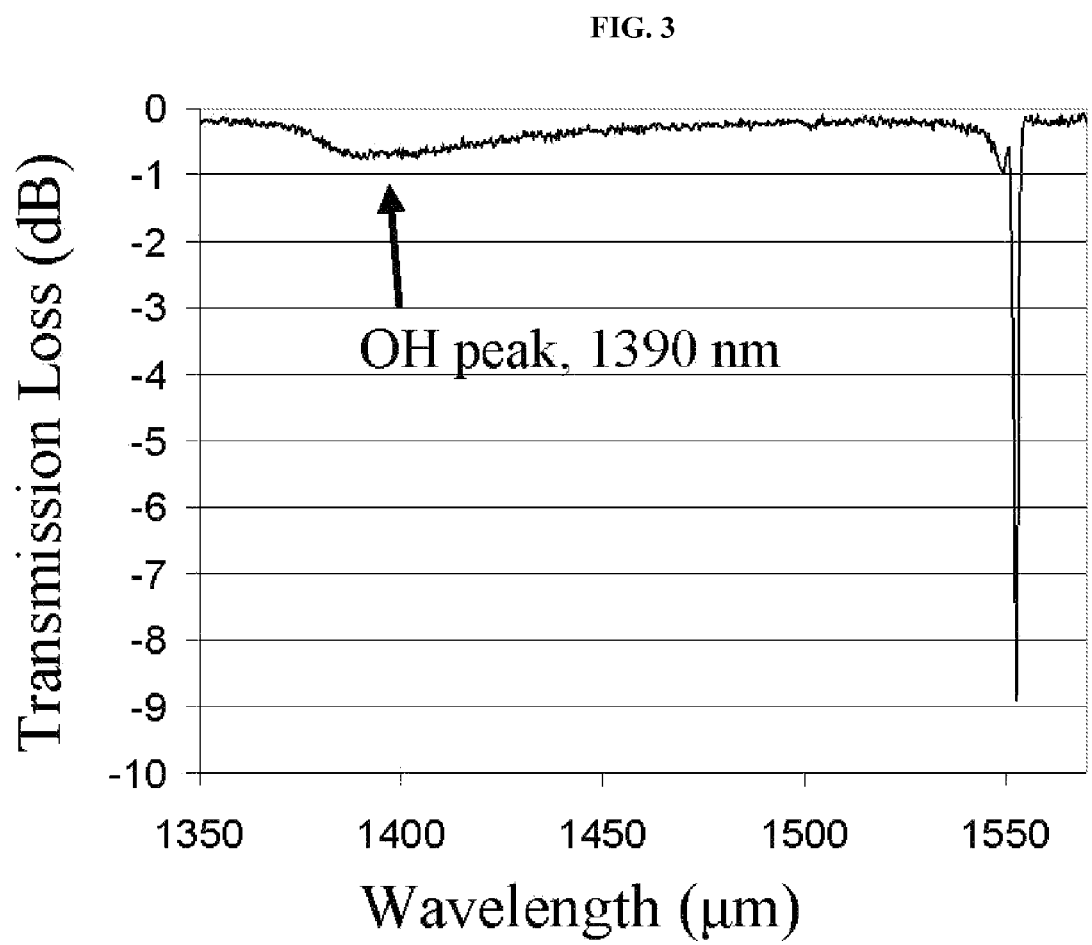
FIG. 3 shows a broadband absorption spectrum of a Bragg grating induced in hydrogen loaded 3% Ge-doped single mode silica telecom optical fiber (SMF-28) with 800 nm 125 fs laser radiation and a 1.071 µm period phase mask. The presence of an OH absorption peak at 1390 nm is observed.

In FIG. 2 and 3, high index modulation Bragg gratings were induced in both unloaded (FIG. 2) and hydrogen-loaded (FIG. 3) 3% Ge-doped SMF-28 silica telecom fiber. Femtosecond pulse duration IR induced index changes in hydrogen-loaded Ge-doped silica result in the formation of absorption bands related to hydroxyl (OH) species indicating that dissociation of the molecular hydrogen is occurring along with a chemical reaction to form the OH species. It would therefore be desirable to load the slab waveguide with deuterium gas as opposed to hydrogen if a 1.39 µm absorption band associated with OH is undesirable.

Aside from enhanced photosensitivity of Ge-doped silica caused by hydrogen loading, other dopant materials used for waveguides in silica that are photosensitive to UV exposure also benefit from improved photosensitivity by hydrogen loading. These include co-doping of Ge with Boron (B) or Tin (Sn). Other dopants that exhibit enhanced photosensitivity, exclusive of Ge, when hydrogen loaded are phosphorous ($P_2O_5$), silicon oxynitride (SiON or nitrogen doped), aluminosilicate ($Al_2O_3$) and aluminosilicate codoped with terbium ($Tb^{3+}$:$Al_2O_3$), or cerium ($Ce^{+3}$:$Al_2O_3$), or erbium ($Er^{+3}$:$Al_2O_3$) or ytterbium ($Yb^{+3}$:$Al_2O_3$) or Europium ($Eu^{2+}$) or Tantalum ($TaO_5$) or Thulium. It is believed that the photosensitivity to high intensity ultrafast IR radiation of these dopants, or combination thereof, would be enhanced through hydrogen or deuterium loading.

Figure 4:
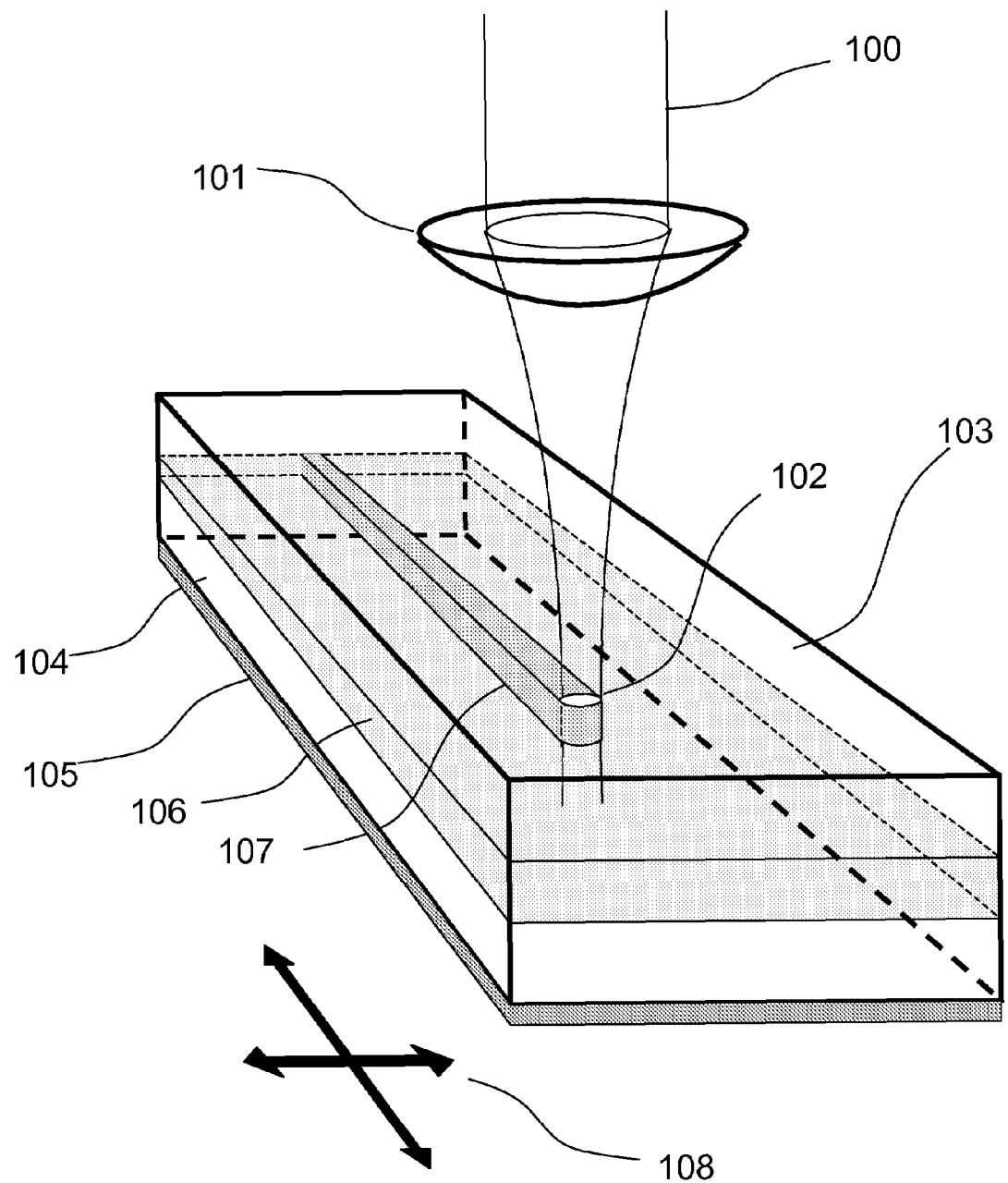
FIG. 4 shows the femtosecond IR photo-induction of a waveguide structure in hydrogen loaded Ge-doped silica slab waveguide.

As shown in FIG. 4, an 800 nm infrared 125 fs pulse duration laser beam 100 is focused through a lens 101 resulting in a focal spot 102 with intensity levels in the silica top cladding layer 103 and bottom cladding layer 104 such that no induced index change is observed. The bottom cladding layer rests on a silicon substrate 105. By hydrogen or deuterium loading, preferential absorption in the Ge-doped silica layer of the waveguide 106 is enhanced by at least a factor of 3, resulting in a localized index change 107 as the beam is scanned along the waveguide. Very high index changes $>5\times10^{-3}$ are possible without damage to the top or bottom silica cladding layers which can result in propagation loss within the photo-induced waveguide 107. Localized induced index change within the Ge-layer 106 is important for prevention of induced index change in the silica cladding layer (top 103 or bottom 104) which may distort the mode field propagating in the laser induced waveguide. Scanning of the laser beam with respect to the waveguide is achieved by either translating the waveguide or laser beam in the X-Y plane 108.

For UV induced gratings, there is a linear correlation between Ge-concentration and the maximum induced index change that is possible when hydrogen loaded. As well the UV induced index change is linearly related to the concentration of UV induced Ge/Si—OH species. (see for example C. Dalle, Patrick Cordier, C. Depecker, P. Niay, P. Bemage, and M. Douay, "Growth kinetics and thermal annealing of UV-induced H-bearing species in hydrogen loaded germanosilicate fibre preforms," Journal of Non-Crystalline Solids, vol. 260, no. 1-2, pp. 83-98, 1999). From Smelser et al. *Opt. Lett.* Vol 29, no. 18, pp. 2127-2129, 2004, hydrogenated pure silica core fiber had a grating formation threshold of $3\times10^{13}$ W/cm$^2$ while hydrogen loaded 3% Ge-doped silica fiber had a threshold for grating formation of $7\times10^{12}$ W/cm$^2$. As the threshold for induced index change in the IR case may be represented by a concentration of defects that correlate with an observable index change, an increase in Ge-doping levels should result in an increase in production of hydrogen related defects for a given IR exposure condition. A 30 fold increase in Ge concentration (that is having pure germania rather than silica) could result in a 30 fold reduction of the threshold for induced index change assuming a linear relationship therefore a threshold intensity of $2\times10^{11}$ W/cm$^2$. It is believed that below an intensity of $10^9$ W/cm$^2$, it is unlikely that there would be a suitable photoinduced index refractive index change with IR photons.

In unloaded Ge-doped silica fiber, the threshold intensity for Type II IR damage gratings occurs at intensities $>5\times10^{13}$ W/cm$^2$. We have shown in our labs that the threshold for Type II-IR grating formation is also reduced by a factor of 3 for hydrogen loaded 3% Ge-doped fiber. For intensities larger than $10^{13}$ W/cm$^2$ the resulted index change would induce physical damage and therefore excess loss. To be inclusive of smaller concentrations of Ge doped fiber the upper limit on the intensity should be $5\times10^{13}$ W/cm$^2$.

In summary this invention provides significant unexpected advantages not heretofore realized.

What is claimed is:

1. A method of increasing the refractive index in hydrogen or deuterium loaded doped glass wherein a dopant within the glass is photosensitive to infrared radiation in the presence of hydrogen or deuterium so as to induce an refractive index change of at least $10^{-5}$ within a region of the glass, the method comprising the steps of:
   irradiating the hydrogen or deuterium loaded doped glass with femtosecond pulses of infrared light having an intensity of at least $10^9$ W/cm$^2$ and less than $5\times10^{13}$ W/cm$^2$.

2. A method as defined in claim 1 wherein the step of irradiating the hydrogen or deuterium loaded doped glass with femtosecond pulses results in the writing of a waveguide within the glass.

3. A method as defined in claim 1 wherein the step of irradiating the hydrogen or deuterium loaded doped glass with femtosecond pulses results in the writing of a grating within the glass within the glass.

4. A method as defined in claim 3 wherein the grating is a Bragg grating.

5. A method as defined in claim 1 wherein the glass is an optical waveguide and wherein the step of irradiating results in the writing of a grating in a cladding or core of the optical waveguide.

6. A method of claim 1 wherein the dopant is at least one of Ge, Ge with Boron (B) or Ge with Tin (Sn) or phosphorous (P$_2$O$_5$), or silicon oxynitride (SiON or nitrogen doped), or aluminosilicate (Al$_2$O$_3$) and aluminosilicate codoped with terbium (Tb$^{3+}$:Al$_2$O$_3$), or cerium (Ce$^{+3}$:Al$_2$O$_3$), or erbium (Er$^{+3}$:Al$_2$O$_3$) or ytterbium (Yb$^{+3}$:Al$_2$O$_3$) or Europium (Eu$^{2+}$) or Tantalum (TaO$_5$) or Thulium.

7. An optical waveguide having a grating made by the method of claim 1.

8. A method of forming a refractive index change in a photosensitive material comprising the steps of:
   providing a photosensitive material that is photosensitized by exposing to one of hydrogen and deuterium gas;
   providing electromagnetic radiation from an ultrashort pulse duration laser, wherein the electromagnetic radiation has a pulse duration of less than or equal to 500 picoseconds, wherein the wavelength of the electromagnetic radiation has a characteristic wavelength corresponding to infrared light, the electromagnetic radiation incident on the photosensitive material being sufficiently intense to cause a permanent change in an index of refraction of the photosensitive material.

9. A method of writing a grating in a doped glass comprising the steps of: exposing the doped glass to an hydrogen or deuterium; and, irradiating the doped glass with light having an intensity of at least $10^9$ W/cm$^2$ and less than $5\times10^{13}$ W/cm$^2$, wherein the non-linear absorption to IR irradiation is increased by hydrogen or deuterium loading the doped glass prior to irradiating with light.

10. A method of writing a grating in a doped glass as defined in claim 9 wherein the intensity of the irradiating IR radiation is less than $10^{13}$ W/cm$^2$.

* * * * *